(12) United States Patent
Smuk

(10) Patent No.: US 6,336,679 B1
(45) Date of Patent: Jan. 8, 2002

(54) ROTARY RECLINER CONTROL MECHANISM FOR MULTIFUNCTION VEHICLE SEAT APPLICATIONS

(75) Inventor: Wojciech Smuk, Troy, MI (US)

(73) Assignee: Bertrand Faure Components Ltd., Mississauga (CA)

( * ) Notice: Subject to any disclaimer, the term of this patent is extended or adjusted under 35 U.S.C. 154(b) by 0 days.

(21) Appl. No.: 09/600,278
(22) PCT Filed: Jan. 28, 1999
(86) PCT No.: PCT/CA99/00067
  § 371 Date: Jul. 14, 2000
  § 102(e) Date: Jul. 14, 2000
(87) PCT Pub. No.: WO99/38723
  PCT Pub. Date: Aug. 5, 1999

Related U.S. Application Data
(60) Provisional application No. 60/072,859, filed on Jan. 28, 1998.

(51) Int. Cl.$^7$ ................................................. B60N 2/02
(52) U.S. Cl. ........................ 297/378.12; 297/378.1; 297/344.1; 297/341
(58) Field of Search ..................... 52/378.12, 378.1, 52/344.1, 341

(56) References Cited

U.S. PATENT DOCUMENTS

| 5,265,937 A | * | 11/1993 | Allen ...................... 297/378.11 |
| 6,102,478 A | * | 8/2000 | Christopher ................ 297/341 |
| 6,152,533 A | * | 11/2000 | Smuk .......................... 297/341 |
| 6,158,800 A | * | 12/2000 | Tsuge et al. ............. 296/65.09 |
| 6,227,619 B1 | * | 5/2001 | Pesta et al. ............ 297/378.12 |

* cited by examiner

Primary Examiner—Carl D. Friedman
Assistant Examiner—Dennis L. Dorsey
(74) Attorney, Agent, or Firm—Patrick J. Hofbauer

(57) ABSTRACT

A rotary recliner control mechanism for use in a vehicle seat assembly, which vehicle seat assembly has a seat back member (44). A cam pin (94) is mounted on the link means (76) for driving engagement with the camming shoulder (112), upon forward pivotal movement of the seat back member (44) to cause the rotation of the interlock plate member (100) against the second biasing means (106), when the link member (76) is in the first link position. The cam pin (94) is also mounted on the linkmeans (76) for clearing motion of the camming shoulder (112) when the link member (76) is in the second link position. A connection means (124) is interconnected between the interlock plate (100) member and the track lock releasing means (36) for unlocking the track lock means when the interlock plate member (100) is rotated, under the driving contact of the cam pin (94).

14 Claims, 14 Drawing Sheets

US 6,336,679 B1

ROTARY RECLINER CONTROL MECHANISM FOR MULTIFUNCTION VEHICLE SEAT APPLICATIONS

The application claims the benefit of U.S. Provisional Application No. 60/072,859, filed Jan. 28, 1998.

FIELD OF THE INVENTION

The present invention relates to a rotary recliner control mechanism for use with a vehicle seat assembly having a rotary recliner positioned to control the pivotal folding of a seat back member of the seat assembly relative to the seat cushion member of the assembly, which control mechanism is especially suited for incorporation into such a seat assembly also having an E-Z entry mechanism.

BACKGROUND TO THE INVENTION

Automotive vehicles typically have one or more seat assemblies wherein the seat back member thereof may be forwardly folded over the seat cushion member (sometimes termed "tilting" or "tipping" of the seat back member) to allow access to space within the vehicle behind the seat assembly. Moreover, utility type vehicles, such as minivans, station wagons, hatchbacks, sport-utility vehicles, and the like, are commonly constructed such that the seat back members of one or more of the vehicle seat assemblies may be folded fully forward, so that the seat back member is substantially horizontal (sometimes termed "dumping" of the seat back member), thus permitting the rear surface of the seat back member to form a temporary "load floor" for storage of luggage and the like thereon. In this latter case, it is desirable to be able to lock the folded seat back member in its substantially horizontal configuration before placing the luggage etc. to be stowed on top of the seat back member. It is also sometimes desirable in such vehicles for the entire seat assembly (ie., both the seat cushion member and the seat back member, in unison), to be translated forwardly relative to the floor of the vehicle in order to temporarily provide more space behind the seat, as for example, to allow easier ingress and egress of passengers into the space behind front vehicle seat assemblies. This latter design requirement has often been met, especially in the case of smaller vehicles, by having a so-called "E-Z entry" feature incorporated into seat assemblies where such translational movement is required. In E-Z entry systems, the entire seat assembly slides forwardly within the vehicle on a seat track mechanism when the seat back member of an unoccupied seat assembly is forwardly dumped, usually under forward urging by a biasing means associated with the seat track mechanism. E-Z entry seat systems are well-known in the vehicle seating art, and examples thereof can be seen in U.S. Pat. No. 4,101,169, issued Jul. 18, 1978 and in U.S. Pat. No. 5,597,206, issued Jan. 28, 1997.

Furthermore, it is common for vehicle seat assemblies, particularly front vehicle seat assemblies, to have a reclining mechanism for the seat back member, which reclining mechanism allows for pivotal adjustment of the seat back member from a relatively vertical, occupiable orientation through a range of increasingly rearwardly inclined positions. Such adjustable rearward pivotal movement of the back rest is typically referred to as "reclining" of the seat back member, and the seat assembly hardware which provides for same is called a "recliner" or a "reclining mechanism".

Numerous mechanisms are known for controlling the features of tipping of seat back members, dumping of seat back members, reclining of seat back members and fore and aft translational movement of an entire seat assembly through the use of E-Z entry mechanisms upon full forward tilting of the seat back member. However, such known devices typically utilize separate load bearing locks, latches, or recliners for each of these seat back member functions, with each of these being actuated by an independent actuation mechanism. The complexity and cost of such prior art designs make it difficult to offer them in high volume/low cost vehicle applications. Another problem with this "multiple latch" or "latch upon latch" approach of the prior art, is that it multiples the number of issues related to strength, durability, reliability, release effort and noise. Lastly, the "latch upon latch" approach results in tolerance stacking problems, which, in turn, raises quality control concerns. All of these issues are of serious concern to present-day vehicle manufacturers, who demand continually higher quality content at increasingly lower prices.

The present invention overcomes these and other problems associated with the prior art by providing a vehicle seat assembly that allows for control of the multiple seat functions of: full forward folding of the seat back member (ie., dumping of the seat back member); tipping of the seat back member (ie., partial forward folding of the seat back member); reclining of the seat back member, (ie., adjustable rearward inclination adjustment of the seat back member) and E-Z entry control through the use of but a single recliner in combination with a unique interlocking system interconnected between the recliner and various other components of the vehicle seat assembly. This is accomplished by a simple mechanism that requires exertion of little effort by the user, is quiet in use, is simple and inexpensive to manufacture, is reliable, and does not exhibit the stacked tolerances of prior art devices having similar utility.

SUMMARY OF THE INVENTION

Accordingly, the present invention relates to a rotary recliner control mechanism for use in a vehicle seat assembly attachable to a vehicle floor, which vehicle seat assembly has a seat back member defining a longitudinal seat back axis, said seat back member frame being mounted on a seat cushion member by means of a rotary recliner operable between locked and unlocked configurations to selectively control pivotal movement of the seat back member frame member relative to the seat cushion member about a substantially horizontal pivot axis, and at least two seat track assemblies, with each seat track assembly having a first track section attachable to the vehicle floor and extending from front to rear when installed on the vehicle floor, and a second track section which is attachable to the seat cushion member and is slidably engaged with the first track section, and a track locking assembly having a track lock means for locking the first and second track sections together at any position from a forward position of the second track section to a rearward position of the second track section and a track lock releasing means for selectively unlocking the track lock means from locking as aforesaid. The rotary recliner control mechanism of the invention comprises a recliner control crank member mounted on the rotary recliner for movement of the recliner control crank member between first and second crank positions corresponding to said locked and unlocked configurations, respectively, of said rotary recliner. The recliner control crank member is biased by the rotary recliner towards the first crank position. A first handle control means is mounted on the seat back member and is connected to the recliner control crank member for selective movement of the recliner control crank member between the first and second crank positions against the aforementioned biasing of the rotary recliner. An elongate link member, having opposed first and second ends, is connected adjacent its first end to the seat back member for sliding movement relative to the longitudinal seat back axis between first and second link positions. The elongate link member is connected adjacent its second end to a pivot point for pivotal movement around the substantially horizontal pivot axis concurrent with the pivotal movement of the seat back member and for said sliding movement of the link member transverse to the substantially horizontal pivot axis. A first biasing means is also provided for biasing the link member towards said first link position. The link member has a laterally displaced foot portion adjacent to its second end, with the foot portion being adapted to frictionally engage the recliner control crank member upon the aforementioned sliding movement of the link member from its first link position to its second link position, so as to cause the recliner control crank member to attain the second crank position when the link member has moved to the second link position, thereat to cause the rotary recliner to attain its unlocked configuration. A second handle control means is mounted on the seat back member and connected to the link member for selective movement of the link member between the first and second link positions against the aforementioned biasing of the first biasing means. An interlock plate member is mounted on the seat frame member in rotatable relation to the substantially horizontal pivot axis for rotation between first and second rotational limit positions. The interlock plate member has a camming shoulder positioned adjacent a top edge of the interlock plate member. A second biasing means for biasing the interlock plate member towards said first rotational limit position is also provided. A cam pin is mounted on the link means for driving engagement with the camming shoulder, upon forward pivotal movement of the seat back member to cause the aforementioned rotation of the interlock plate member from its first rotational limit position to its second rotational limit position against the biasing of the second biasing means, when the link member is in the first link position. The cam pin is also mounted on the link means for clearing motion of the camming shoulder by the cam pin, when the link member is in the second link position. A connection means is interconnected between the interlock plate member and the track lock releasing means for unlocking the track lock means when the interlock plate member is rotated, as aforesaid, under the driving contact of the cam pin a threshold distance toward the second rotational limit position. This latter action of the interlock plate member has the effect of providing for activation of an E-Z entry system incorporated into the seat track slide mechanism upon forward tilting of the seat back member a threshold distance, after actuation of the first handle control means. Accordingly, all pivotal movement of the seat back member relative to the seat cushion member is under the control of a single locking member, being the rotary recliner mechanism.

In one embodiment of the invention, the rotary recliner has a rotational axis coincident with the substantially horizontal pivot axis.

In a further embodiment of the invention, the recliner control crank is mounted on the rotary control recliner for movement of the recliner control crank member between the first and second crank configurations of the recliner control crank by rigid transverse attachment of the recliner control crank to a control shaft protruding from the rotary control in coincident relation to said substantially horizontal pivot axis.

In another embodiment of the invention, the pivot point about which the recliner control crank member is mounted is on the central axis of the aforementioned control shaft, which control shaft passes through an elongated slot formed in the elongate link member adjacent its second end to allow for the aforementioned rigid transverse attachment of the recliner control crank member to a free end of the control shaft.

In another embodiment of the invention, the top edge of the interlock plate member defines a convexly arcuate cam pin follower surface having a defining axis coincident with the substantially horizontal pivot axis, and the cam follower surface is positioned to allow said the cam pin to slide therealong upon forward pivotal movement of the seat back member relative to the seat cushion member, when the link member is in its second link position, so as to prevent return of the link member, under biasing of the first biasing means, from the second link position to the first link position, during pivotal movement of the seat back member, thereby to hold the rotary recliner in its unlocked configuration during the forward pivotal movement of the seat back member.

In another embodiment of the invention, a radially inwardly directed cam pin release notch is positioned on the interlock plate member adjacent the forward extent of the arcuate cam follower surface so as to permit the cam pin to enter into the release slot from the sliding interaction with the cam follower surface under the biasing of the link member by the first biasing means so as to permit the link member to return to the first link position, thereby to allow the rotary recliner to return to its locked configuration upon full forward pivotal movement of the seat back member to a load floor configuration.

In a preferred embodiment of the invention, the first handle control means comprises a Bowden cable operatively connected at a first end to a lever handle member pivotally mounted on the seat back member, and at its opposed second end to the recliner control crank member. In this embodiment, the second handle control means comprises a Bowden cable operatively connected at a first end to a lever handle member mounted on the seat back member, and at its opposed second end to the first end of the link member. Also in this embodiment, the connection means comprises a Bowden cable operatively connected at a first end to said track lock means and, at its opposed second end to said interlock plate member.

Other advantages, features and characteristics of the present invention, as well as methods of operation and functions of the related elements of the structure, and the combination of parts and economies of manufacture, will become more apparent upon consideration of the following detailed description and the appended claims, with reference to the accompanying drawings, the latter of which is briefly described hereinbelow.

DETAILED DESCRIPTION OF A PREFERRED EMBODIMENT

E-Z entry seat mechanisms are well-known in the vehicle seat art. In such mechanisms, the seat track lock is automatically released to allow forward sliding of the seat assembly within the vehicle upon forward dumping of the seat back member. Various types of E-Z entry mechanisms have been patented, and most of these mechanism include a biasing spring which automatically pulls the entire seat assembly forward upon release of the track lock through the agency of the E-Z entry mechanism. An example of one such patented E-Z entry system is shown in U.S. Pat. No. 4,101, 169, issued Jul. 18, 1978, the teachings of which patent are incorporated herein by reference.

Figure 1:
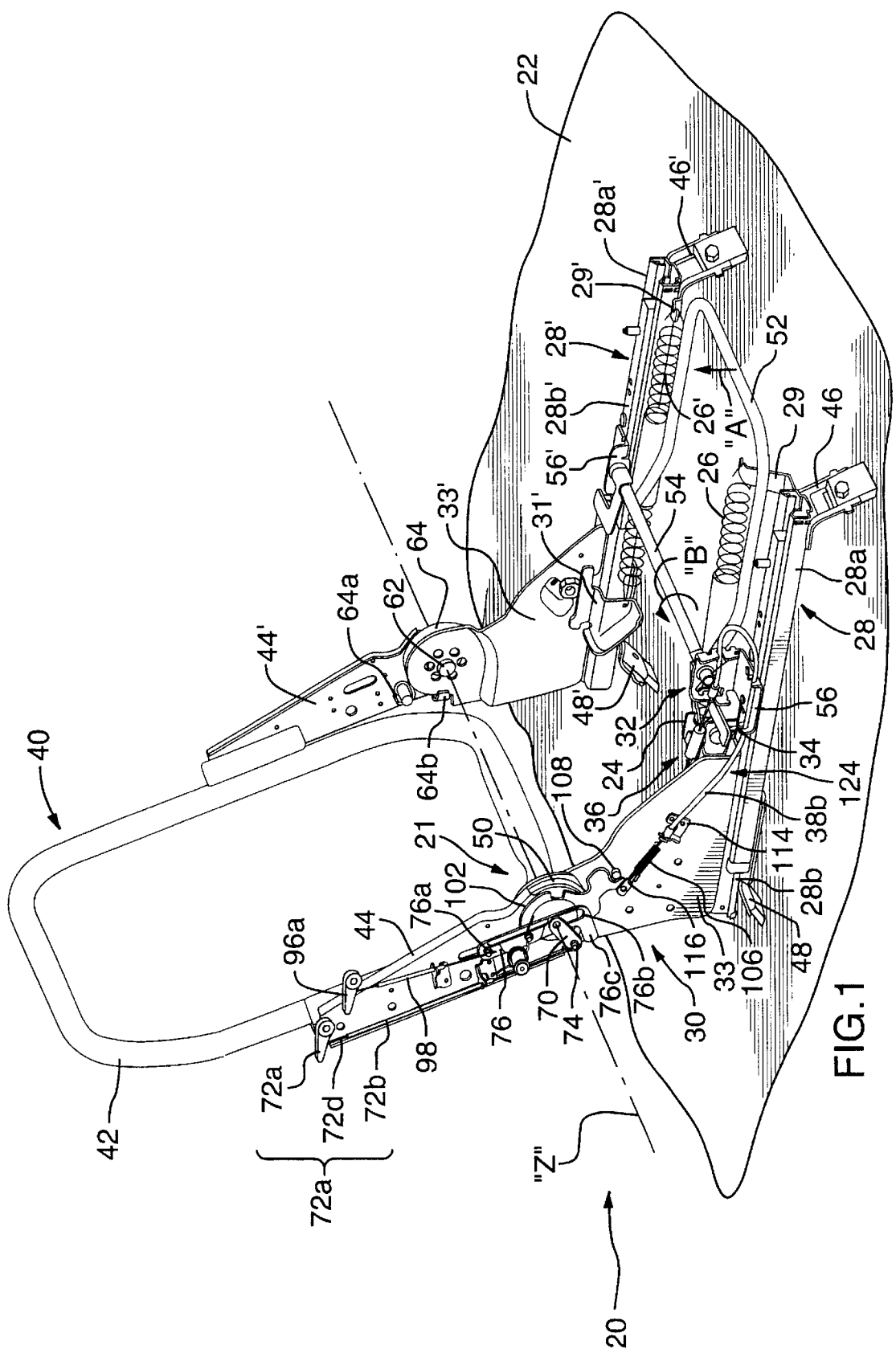
FIG. 1 is a front side perspective view of a vehicle seat assembly having a preferred embodiment of recliner control mechanism according to the present invention installed thereon, said seat assembly being attached to the floor of a vehicle, with the seat back member and the seat cushion member of the assembly shown in a normal upright operating position, referred to in the art as a "design" position.

In FIG. 1 of the drawings, there is shown an embodiment of vehicle seat assembly 20 in the general upright design configuration and having an E-Z entry system therein, said E-Z entry system being under the control of a rotary recliner control mechanism 21 according to a preferred embodiment of the present invention. The vehicle seat assembly is installed on a vehicle floor 22 (partially shown) of a vehicle (not shown). The seat assembly 20 is mounted on left hand track assembly 28 and right hand track assembly 28'. Left hand track assembly 28 is secured to the vehicle floor 22 by front floor mounting bracket 46 and rear floor mounting bracket 48. Similarly right hand track assembly 28' is secured to floor 21 by similar floor mounting brackets 46' and 48'.

The track assemblies shown are of a prior art design, and are best seen and understood with reference to FIGS. 1, 2, 8, and 9. Similar structural members in each of the right hand 28' and left hand 28 track assemblies shown in FIGS. 1, 2, 8 and 9 have similar numbers, except that numerals for the right hand track assembly 28' have a prime after the numeral, e.g. 28 (left hand side), 28' (right hand side). For clarity and ease of description, only the left hand side 28 track assembly and its related structures will be specifically referenced hereafter, even though FIGS. 1, 2, 8 and 9 show both the left and right hand track assemblies.

Figure 2:
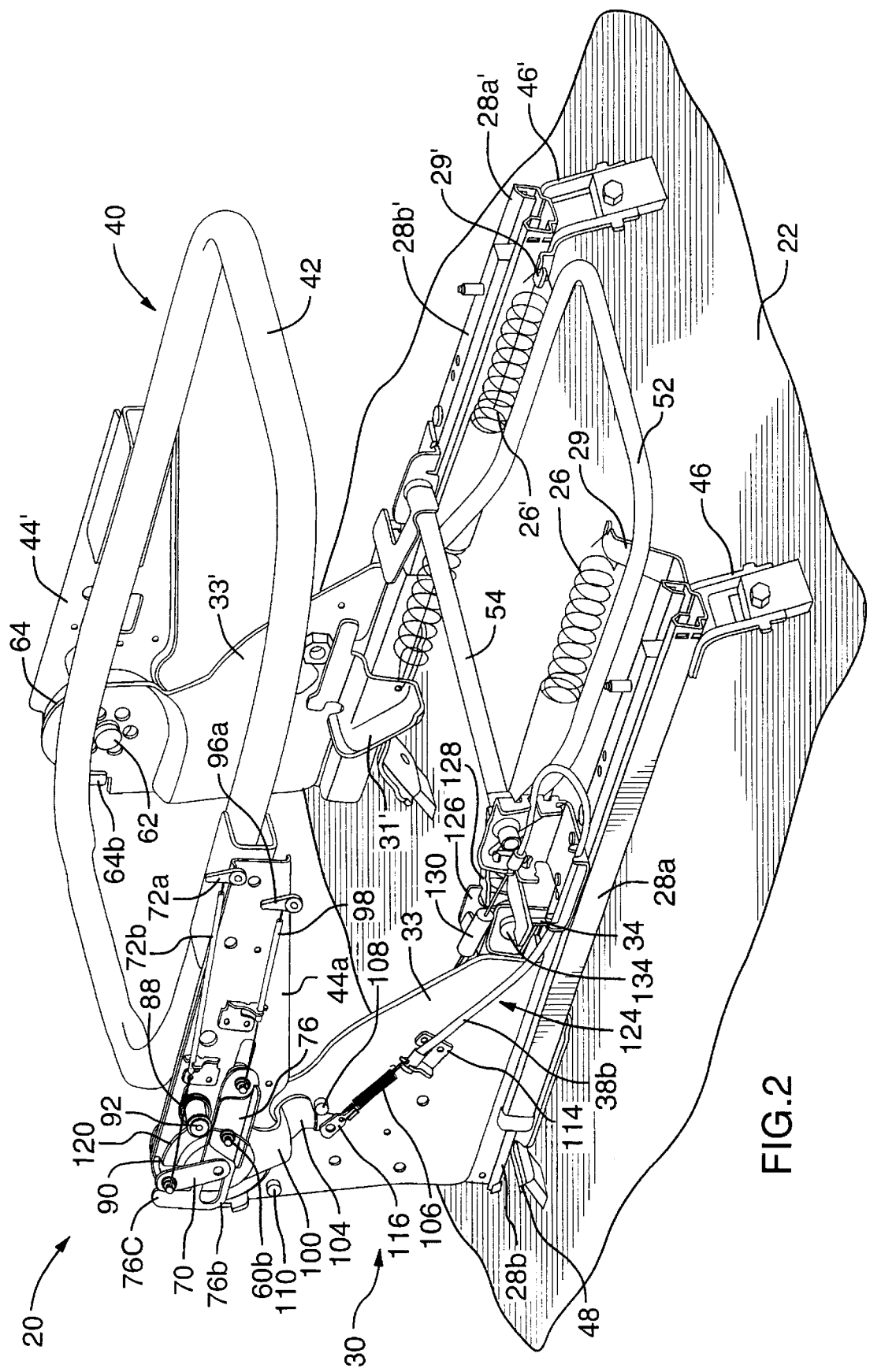
FIG. 2 is a similar view to that of FIG. 1, with the seat back member shown locked in its full forwardly folded (dumped) configuration, so as to provide a load floor atop the back of the seat back member.
Figure 8:
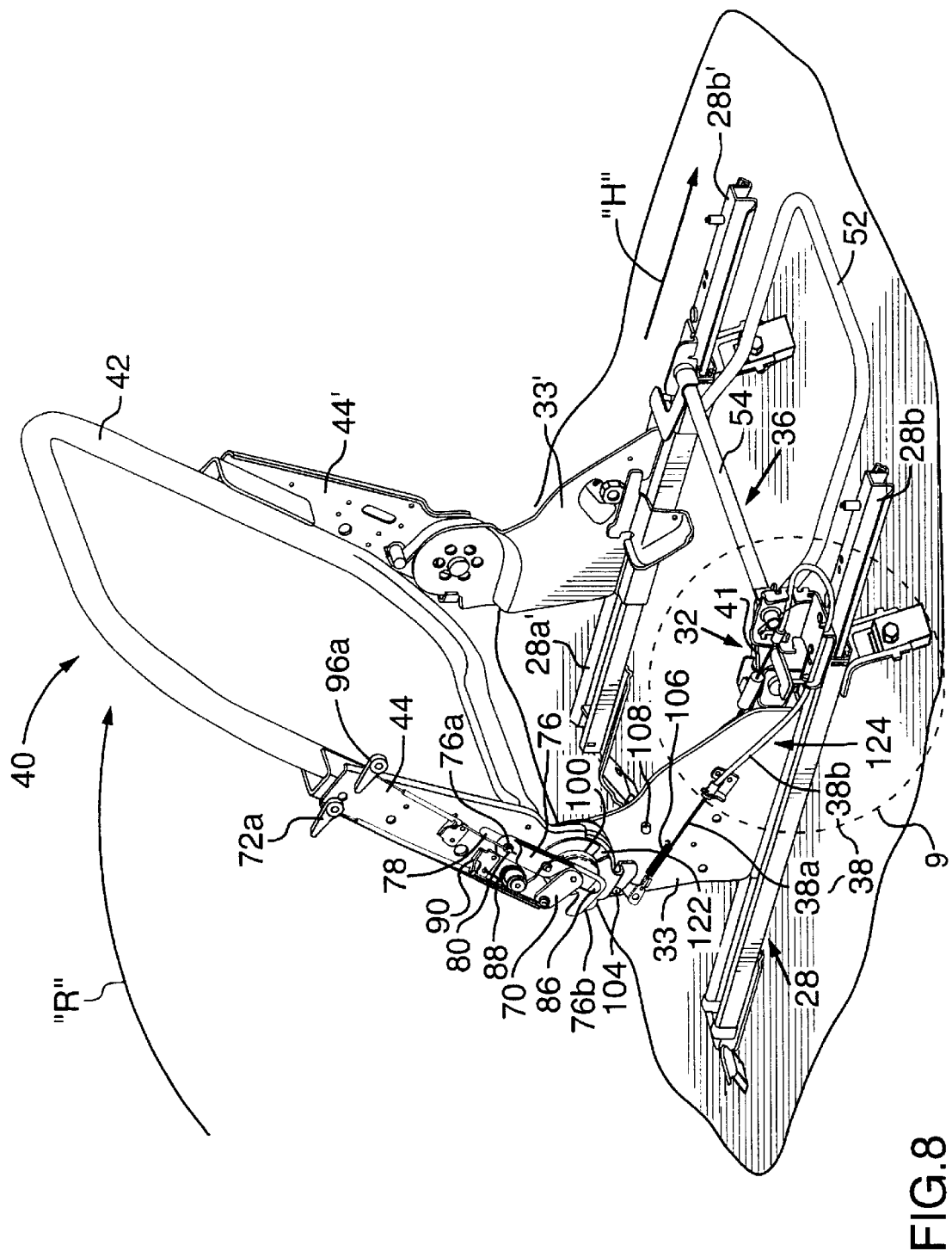
FIG. 8 is a front side perspective view of the seat assembly of FIG. 1, showing components of the recliner control mechanism in substantially the same configuration as shown in FIG. 7, and further illustrating the connection means interconnected between the interlock plate member and the track lock releasing means acting to unlock the track lock means.
Figure 9:
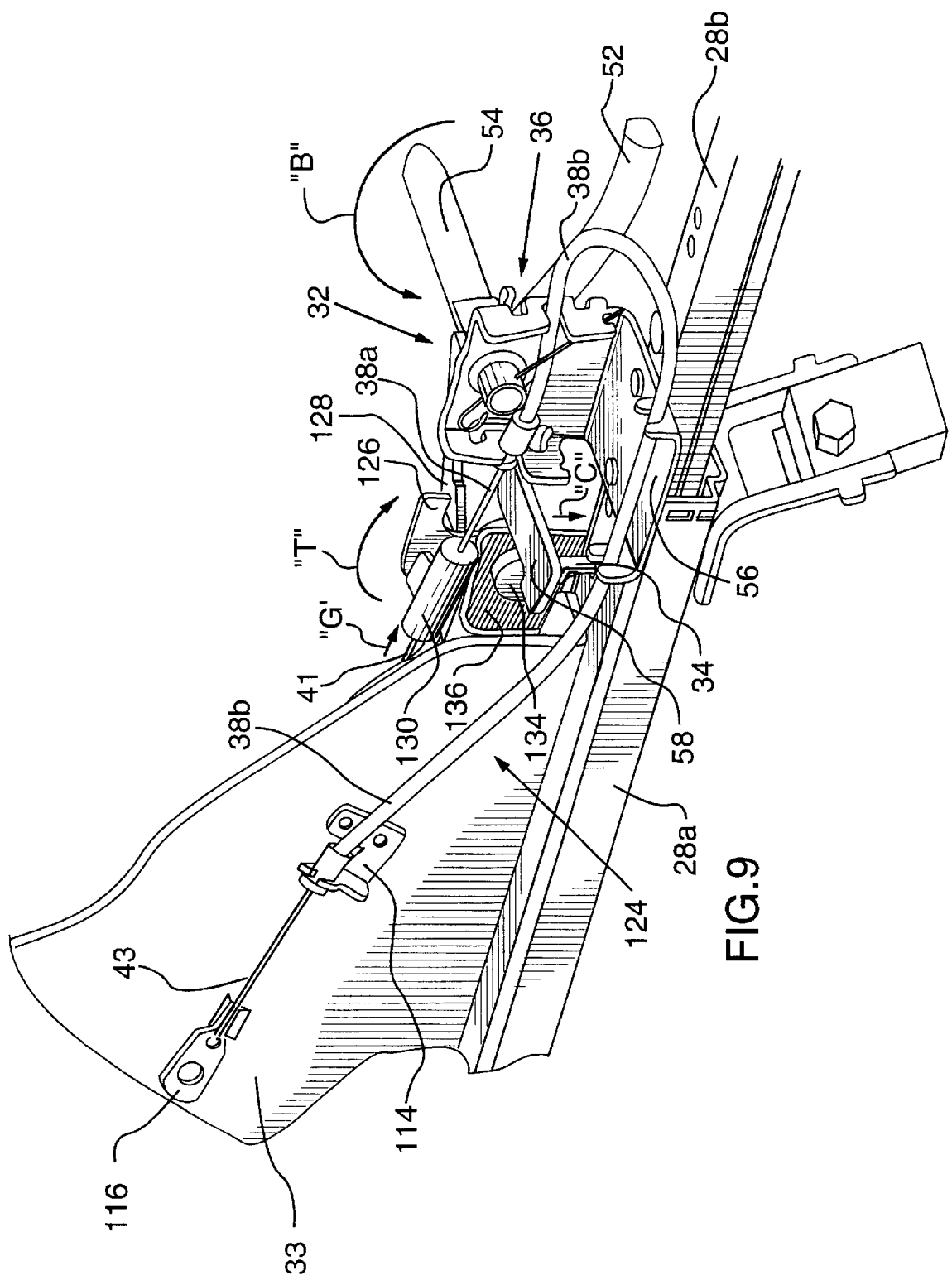
FIG. 9 is an enlarged scale view of the encircled area 9 of FIG. 8.

The seat track assemblies 28 and 28' may be used to adjust the position of the entire seat assembly 20 in the forward (i.e., to the front of the vehicle, and to the right of FIG. 1) and aft (i.e., to the rear of the vehicle, and to the left of FIG. 1) directions. Seat track assembly 28 has a first (lower) seat track section 28a which is bolted, screwed, or otherwise affixed to the vehicle floor 22, e.g. through front and rear floor mounting brackets 46, 48. A second (upper) seat track section 48b slides within a lower seat track section 48a in operatively confined relation, as is well-known in the art. A track locking assembly, generally designated by reference numeral 32, comprises a known track lock means, having a track lock, not visible in the drawings (as it is positioned within a cavity defined between the first 28a and second 28b track sections), and a track lock actuator member 34, which actuator member 34 is operatively connected to the track lock means and protrudes upwardly through the second (upper) track section 28b (as best seen in FIG. 9) for operative contact with the components of the track lock releasing means 36 in a manner described below. Neither the track lock means nor the track lock actuator means are a novel part of the present invention, having been previously known in the prior art in various operative forms. The track lock means (not visible) is adapted for locking of the first 28a and second 28b track sections together at any position, from a forward position of the second track section 28b (as seen in FIGS. 8 and 9), to a rearward position of the second track section 28b (as seen in FIGS. 1 and 2). The track locking assembly 32 also comprises a track lock releasing means, generally designated by the reference numeral 36, for selectively unlocking the track lock means (not visible) in one of two independent manners described below. When the track lock means (not visible) is unlocked, the E-Z entry mechanism 24 is actuated, causing the seat assembly 20 to translate forwardly from the general configuration shown in FIG. 1, to the general configuration shown in FIG. 8, as is also described more fully below.

The first manner of unlocking the track lock means (not visible) is through manual manipulation by a user of the track lock releasing means 36. The track lock releasing means 36 comprises a handlebar member 52 pivotally mounted by means of a crossbar member 54 on a mounting bracket 56 (see FIG. 9), and a bent end finger 58 mounted on the crossbar 54. The user may unlock the track lock means (not shown) for selective adjustment of the fore and aft positioning of the seat assembly 20 (if the seat is occupied), or for full forward translation of the seat assembly 20 to the position of FIG. 8 (if the seat is unoccupied), by grasping handlebar 26 and pulling same upwardly in the direction of arrow "A" of FIG. 1, which in turn causes pivoting of crossbar member 54 in the counter-clockwise direction of arrow "B" of FIG. 9, with concurrent generally downward movement (in the direction of arrow "C" of FIG. 9) of bent end finger 58, which is welded to the crossbar member 54, so as to cause operative downwardly urging contact of the bent end finger 58 with the track lock actuator member 34, thus releasing the track lock means (not visible).

The other manner of unlocking the track lock means (not visible) involves the inventive interaction of the rotary recliner control mechanism 21 of the present invention with other components of the seat assembly 20, including, ultimately, the track lock releasing means 36, which manner will be described in more detail below.

Each seat track assembly 28 preferably has a biasing coil spring 26, which coil spring 26 is operatively interconnected between a bracket 29 rigidly mounted on the first (lower) track section 28a and a spring attachment bracket 31 rigidly mounted on the second (upper) track section 22b. Release of the track lock means (not visible) in either of the two modes referred to hereinabove allows the tensile force in springs 26 and 26' to pull upper tracks 22b and 22b' forward relative to lower tracks 22a and 22a, thereby causing the seat assembly 20 to move forward as described above. It will be understood that other, mechanically equivalent known track assemblies may be used within the scope of the present invention.

Figure 4:
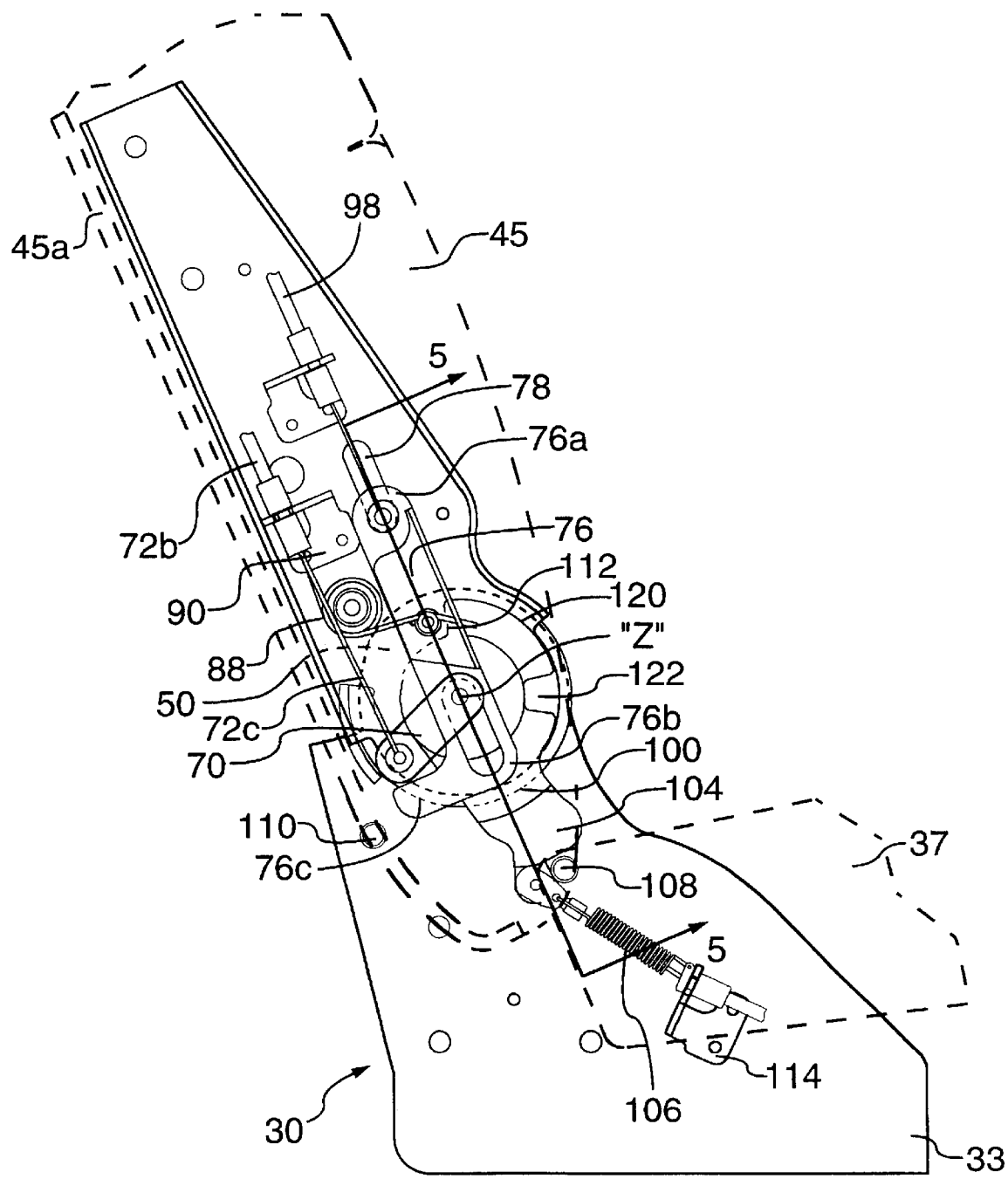
FIG. 4 is a side elevational view of the recliner control mechanism of FIG. 3, with the seat back member and the seat cushion member of the seat assembly shown in phantom outline.

The vehicle seat assembly shown in the Figures comprises a seat back member 40 defining a longitudinal seat back axis "X" (see FIG. 4). The seat back member 40 comprises a frame member 42, which is rigidly attached at opposite lateral sides to right 44 and left 44' seat back mounting brackets, which brackets are mirror images of one another. Cushioning material 45 and a rear plastic covering 45a of the seat back member 40 have been removed from all Figures for ease of illustration, but are conventionally mounted on the seat back frame member 42, and is shown in phantom outline in FIGS. 4, 6, 7, and 10 through 14. The seat assembly 20 further comprises a seat cushion member 30, which member 30 includes right 33 and left 33' seat cushion brackets rigidly mounted one each to respective ones of the second (upper) track assembly sections 28b and 28b'. A seat cushion frame member has been omitted from all views for ease of illustration, but such seat cushion frame member is conventionally mounted to each of the seat cushion brackets 28b and 28b' so as to provide a platform base for mounting of the seat cushioning 37 shown in phantom outline in each of FIGS. 4, 6, 7, and 10 through 14.

In the preferred embodiment illustrated, the right seat back mounting bracket 44 is mounted on the seat cushion member 30 by means of a rotary recliner 50 operable between locked and unlocked configurations to selectively control pivotal movement of the seat back member 40 relative to the seat cushion member 30 about a substantially horizontal pivot axis "Z" upon locking and unlocking of the rotary recliner 50. The rotary recliner 50 is also of known design, and can, for example, be of the same general type as described in U.S. Pat. No. 5,779,313, issued Jul. 14, 1998, which patent is also incorporated herein by reference. While other types of known rotary recliners have utility in this type of application, a specific form of rotary recliner shown and suitable for this application is available from Bertrand Faure North America, of Troy, Mich., as Discontinuous Round Recliner Part No. 499202 (for right-handed applications) or Part No. 4999203 (for left-handed applications). A right-handed application, only, is shown, with a single rotary recliner 50 being utilized on the right hand side of the seat assembly 20. With specific reference to FIG. 5, it will be seen that this rotary recliner 50 has a smaller flange portion 50a, which is spot welded or otherwise rigidly attached in fixed, non-rotatable relation to the right seat cushion bracket 33, and a larger flange portion 50b, which is spot welded, or otherwise rigidly attached in fixed relation, to the right seat back mounting bracket 44. The internal locking components of the rotary recliner 50 (not shown) permit the larger flange portion 50b to rotate around the smaller flange portion 50a about the substantially horizontal pivot axis "Z" upon movement of these internal locking components to their unlocked configuration by selective rotational actuation of a control shaft 60 protruding from the rotary recliner 50 in alignment with the pivot axis "Z". Internal spring means (not shown) within the rotary recliner 50 bias the internal locking components of the rotary recliner 50 towards the locked configuration of the recliner 50, at which locked configuration the larger flange portion 50b (and the attached right seat back mounting bracket 44) is unable to rotate about the pivot axis "Z".

In the preferred embodiment illustrated, the left hand seat back mounting bracket 44' is pivotally mounted to the left hand seat cushion bracket 33' without the intervening use of a second rotary recliner, although it would be possible, and desirable, in certain seating applications to do so, in which case a slave tube (not shown) would operatively connect the two analogously installed rotary recliners, both arranged to have their respective pivot axis aligned with the substantially horizontal pivot axis "Z". In the arrangement shown, however, the left hand seat back mounting bracket 44' is simply pivotally attached to the left hand seat cushion bracket 33' by means of a conventional pivot bushing 62 operatively interconnecting the two brackets 44' and 33' for pivotal movement about the substantially horizontal pivot axis "Z". A seat back return spring 64 having ends 64a and 64b, in the form of a large clock spring, is also conventionally interconnected between the two brackets 44' and 33' and wound about the pivot bushing 64 so as to bias the seat back member 40 towards the forwardly titled configuration shown in FIG. 8.

Figure 3:
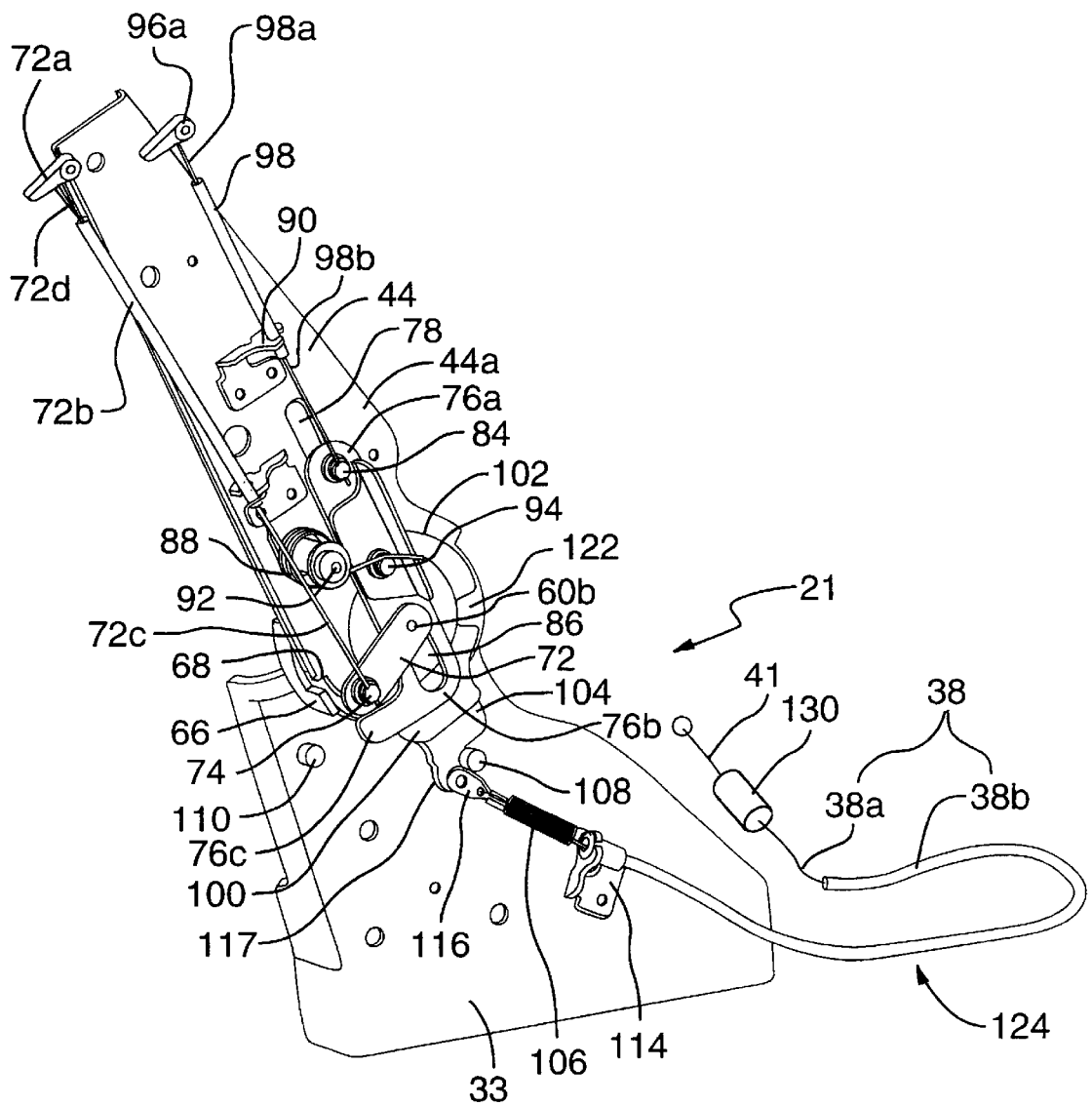
FIG. 3 is a rear side perspective view of key components of the recliner control mechanism in the configuration of FIG. 1, with such components removed from installation on the seat assembly for clarity of illustration.

A protruding stop lug 66 formed on the right hand seat cushion bracket 33 interacts with a corresponding stop shoulder 68 on the right hand seat back mounting bracket 44 to limit rearward pivoting movement of the seat back member 40 relative to the seat cushion member 30 to substantially the design position shown in FIGS. 1, 3 and 4, as best seen in FIG. 3.

The rotary recliner control mechanism 21 further comprises a recliner control crank member 70 rigidly mounted on the control shaft 60 of the rotary recliner 50 by welding or other rigid connection methods, so as to be transversely attached to the control shaft 50 for rotation therewith. Through such connection, the control crank member 70 is able to move the internal locking components (not shown) connected to the internal end 60a of the control shaft 60 of rotary recliner 50 between their locked and unlocked configurations, as previously mentioned. Thus, the control crank member 70 is mounted on the rotary recliner 50 for movement between first (lower) and second (higher) crank positions corresponding to the locked and unlocked configurations, respectively, of the rotary recliner 50. The first (locked) position of the control crank member 70 can be seen in FIGS. 1 through 5, 10, 12, and 13, while the second (unlocked) position of the control crank member 70 can be seen in FIGS. 6 through 8, 11 and 14. The control member 70 is biased by the internal springs of the rotary recliner (not shown), acting through the control shaft 60, towards the first crank position, so that, barring external forces acting on the crank member 70 and control shaft 60, the rotary recliner will assume its locked configuration.

A first handle control means 72, comprising a Bowden cable 72b and a lever handle 72a, is mounted on the seat back member 40 for indirect control by a user of the control crank member 70 to thereby effect pivotal movement of the seat back member 40 relative to the seat cushion member 30 for forward tilting or reclining adjustment of the seat back member 40, without locking of the seat back member 40 in the load floor position or activation of the E-Z entry mechanism as will be described more fully herein. In this regard, and with specific reference to FIG. 3, it will be seen that a second end 72c of the Bowden cable 72b is connected to a button fastener 74 positioned on the recliner control crank member 70, and the opposite other first end 72d of the Bowden cable 72b is connected to the lever handle 72a for pulling activation thereof upon downward movement of the lever handle 72a, thereby to cause selective movement of the recliner control crank member 70 between the first (locked) and second (unlocked)crank positions against said biasing of the rotary recliner 50.

An elongate link member 76, having opposed first 76a and second 76b ends, is connected adjacent said first end 76a to the seat back member 40 for sliding movement relative to said longitudinal seat back axis "X" between first and second link positions as follows. The first end 76a of the link member 76 is preferably connected to the seat back member 40 by means of an elongated slot 78 formed in the seat back mounting bracket 44 in substantial alignment with the longitudinal seat back axis "X". A guide pin 80 is rigidly attached to the link member 76 adjacent the first end 76a of the link member 76, which guide pin 80 extends through the elongated slot 78 of the seat back mounting bracket to an enlarged inboard pin end 82 to retain the guide pin 80 in said elongated slot 78 upon said sliding movement of the link member 76.

The link member 76 is connected adjacent its second end 76b for pivotal movement about a pivot point defined by the central axis of the control shaft 60 (which axis is, of course, aligned with the pivot axis "Z") by means of an elongated slot 86 formed in the link member 76 adjacent its second end 76b, through which elongated slot 86 the control shaft 60 passes for rigid attachment as aforesaid of its outboard free end 60b to the recliner control crank member 70. In this manner, the second end 76b of the elongate link member 76 is connected to a pivot point on the control shaft 60 for pivotal movement around the substantially horizontal pivot axis "Z" concurrent with pivotal movement of the seat back member 40 relative to the seat cushion member 30, and for sliding movement of the link member 76 transverse to said pivot axis "Z".

Figure 10:
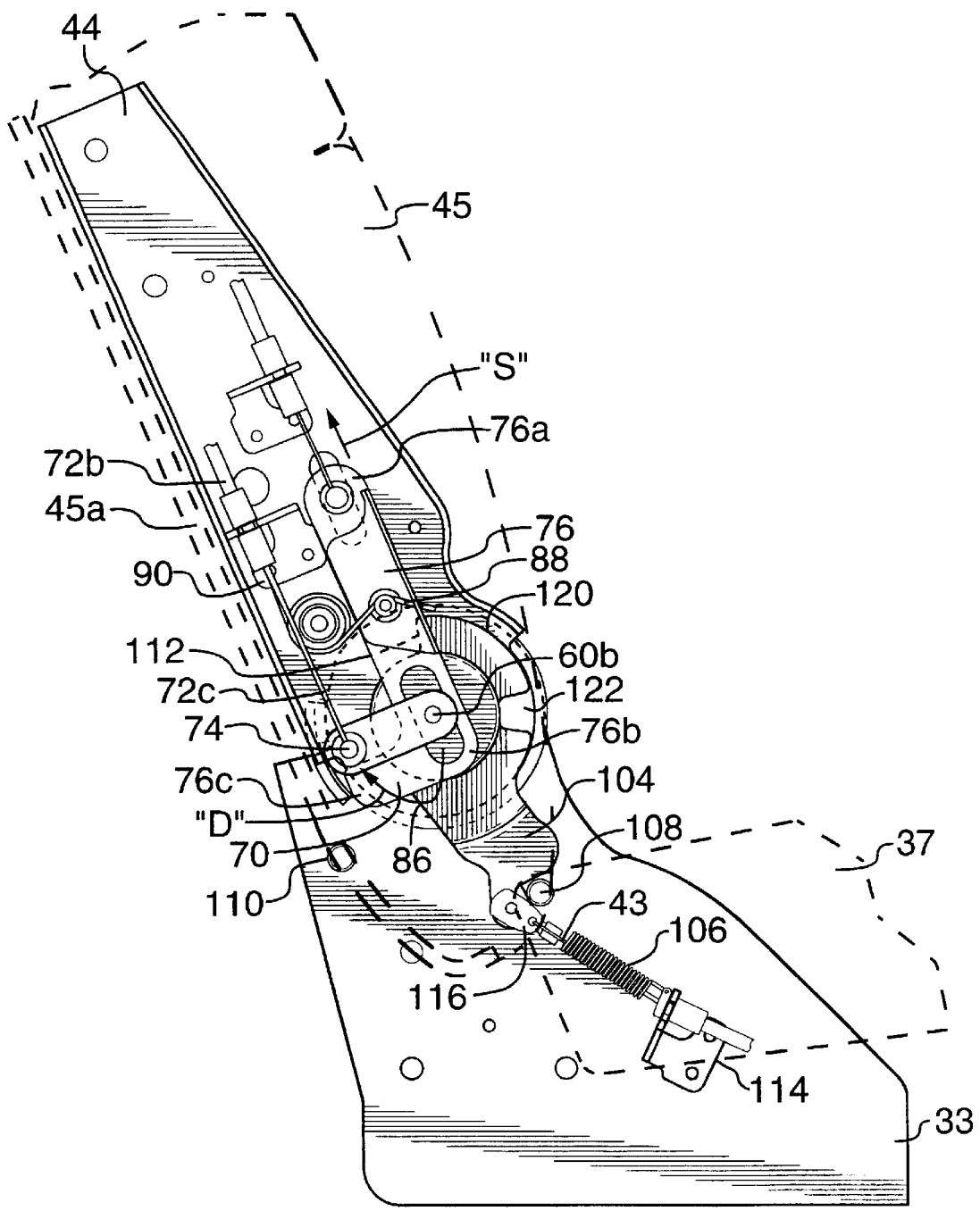
FIG. 10 is a side elevational view similar to FIG. 6, showing the second handle control means being actuated so as cause movement of the link member from the first link position to the second link position, shown in FIG. 101 thereby to unlock the rotary recliner for pivotal movement of the seat back member relative to the seat cushion member with out actuation of the E-Z entry mechanism incorporated into the seat assembly.
Figure 11:
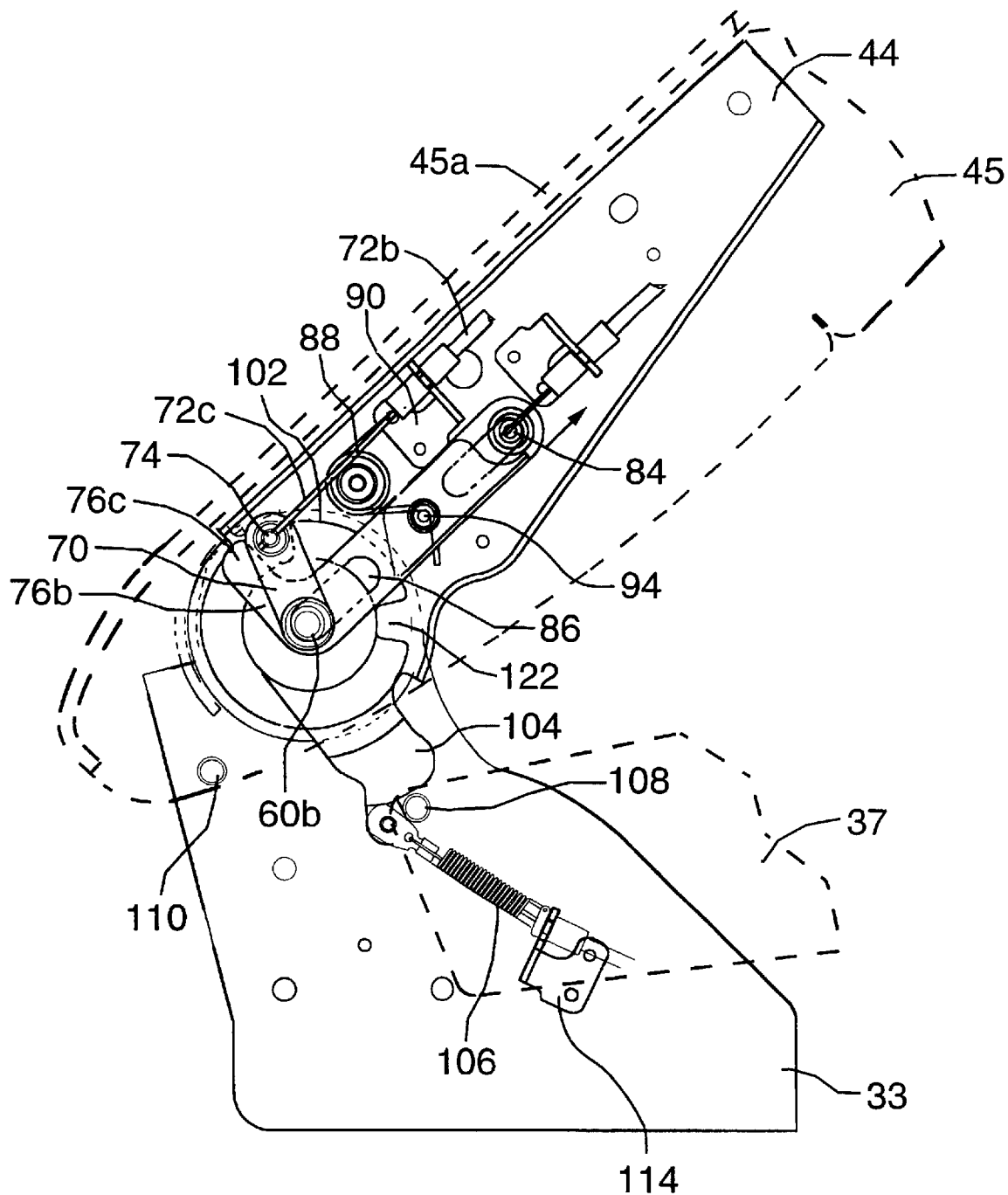
FIG. 11 is a side elevational view similar to FIG. 7, showing the seat back member having been pivotally tilted, after the actuating action of FIG. 10, forwardly about the substantially horizontal pivot axis without corresponding motion of the interlock plate member having taken place.
Figure 12:
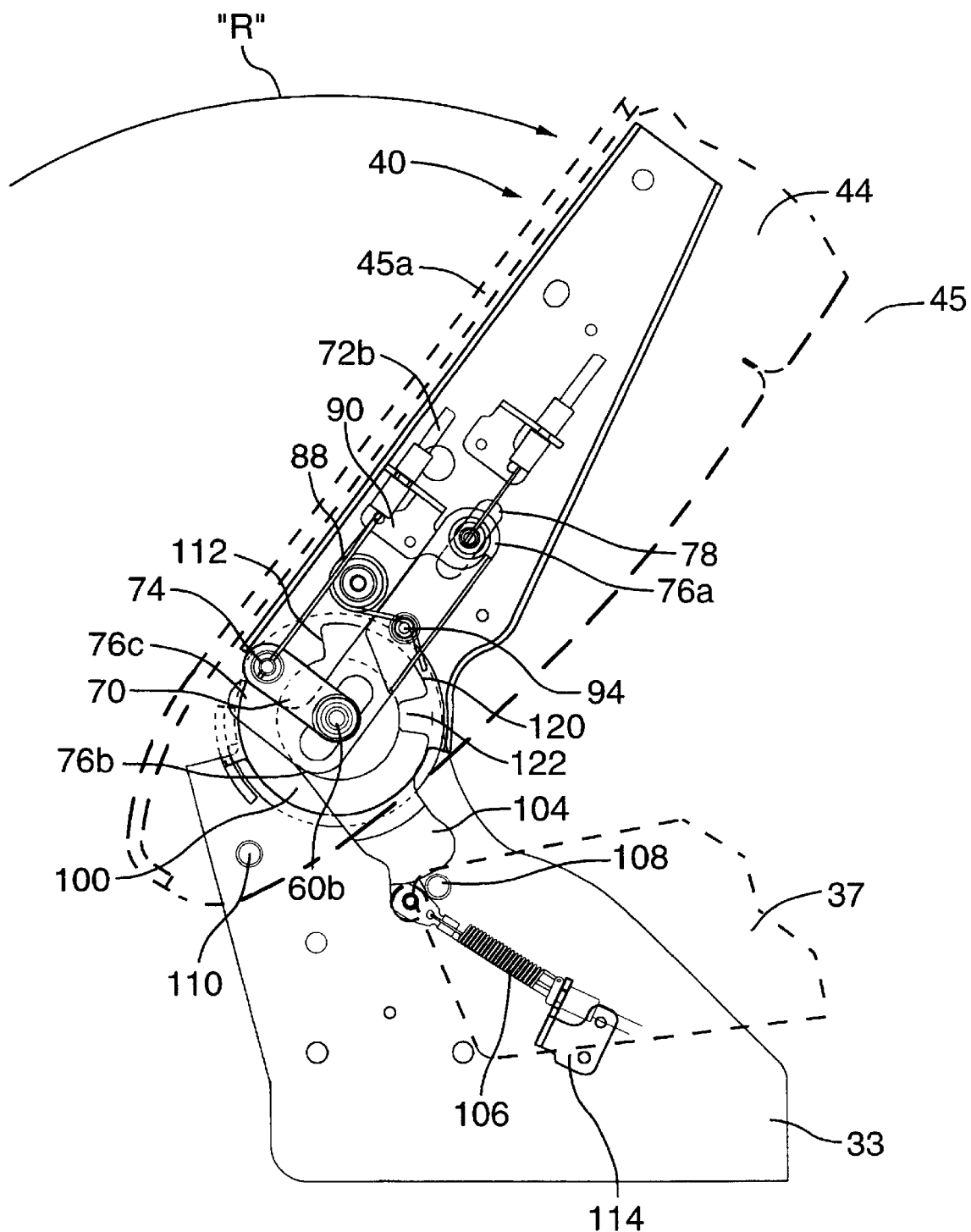
FIG. 12 is a side elevational view showing the seat back member in substantially the same forwardly tilted position of FIG. 11, but with the second handle control means having been released from its actuated configuration as shown in FIGS. 10 and 11.

The first and second link positions of the elongate link member 76 can be seen in FIGS. 1 through 8, 13 and 14 (first link position) and FIGS. 10 through 12 (second link position) respectively, and the significance of these positions will become more apparent as this description progresses.

A first biasing means, in the form of torsion spring 88, biases th e link member 76 towards the first link position. The torsion spring is operatively attached at one of its ends end to a backrest bracket 90, and at its other end to a cam pin 94 rigidly mounted on the link member 76 proximate to its midsection.

The link member 76 has a laterally displaced foot portion 76c adjacent its second end 76b, said foot portion 76c extending substantially transversely to the major axis of the link member 76 and being dimensioned and otherwise adapted to frictionally engage the recliner control crank member 70 upon said sliding movement of said link member 76 from said first link position to said second link position. Such frictional engagement preferably occurs, as can be seen in FIGS. 10, 11 and 12, between the foot portion 76c and the button fastener 74 positioned on the recliner control crank member 70, thereby to cause the recliner control crank member 70 to attain said second crank position when the link member 76 has moved to the second link position. As previously discussed, movement of the recliner control crank member 70 to the second crank position causes the rotary recliner 50 to attain its unlocked configuration, thereby allowing the seat back member 40 to pivot about the substantially horizontal pivot axis "Z".

A second handle control means 96 is mounted on the seat back member 40 and is connected to the link member 76 as follows. The second handle control means 96 comprises a lever handle member 96a pivotally mounted on the seat back member 40 and a Bowden cable 98 operatively connected at a first end 98a of the Bowden cable 98 to the lever handle member 96a and at a second end 98b to the first end 76a of the link member 76. This latter connection of the second end 98b of the Bowden cable 98 to the link member 76 is preferably carried out by means of retained connection of the second cable end 98b to the outboard end 84 of the guide pin 80, which outer end forms a cable button for such connection. This arrangement provides for selective movement of the link member 76 between said first and second link positions against said biasing of the first biasing means 88 upon pivotal movement of the lever handle member 96a as described more fully below.

Figure 5:
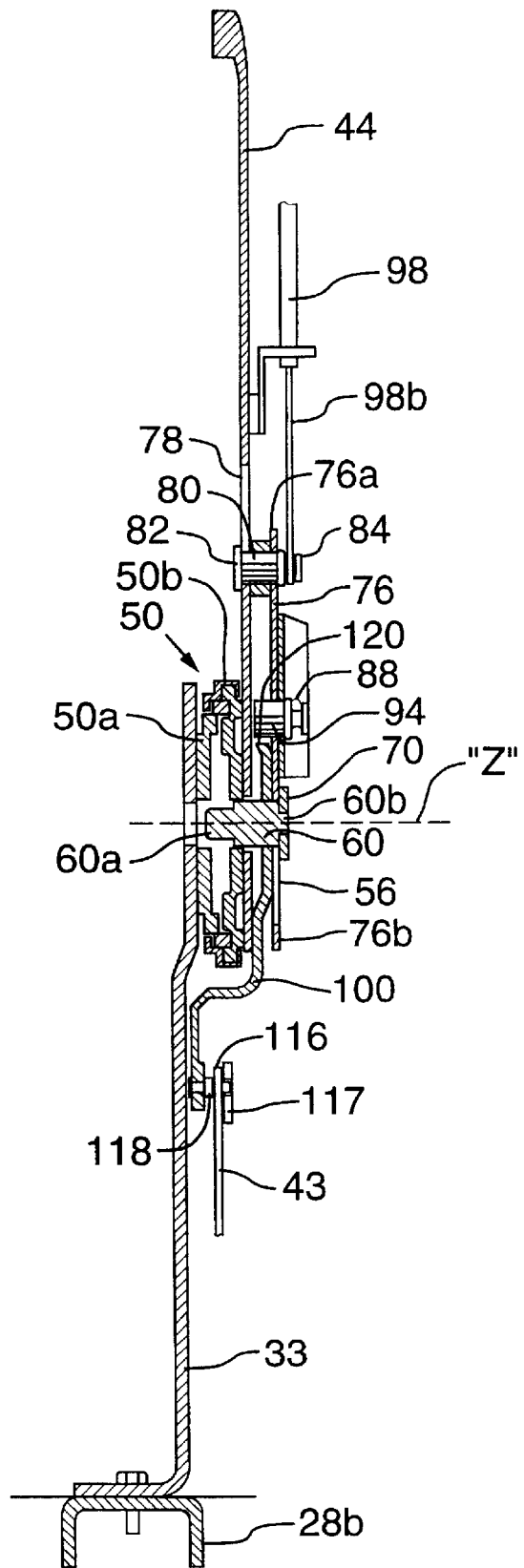
FIG. 5 is a sectional view along sight line 5—5 of FIG. 4.
Figure 6:
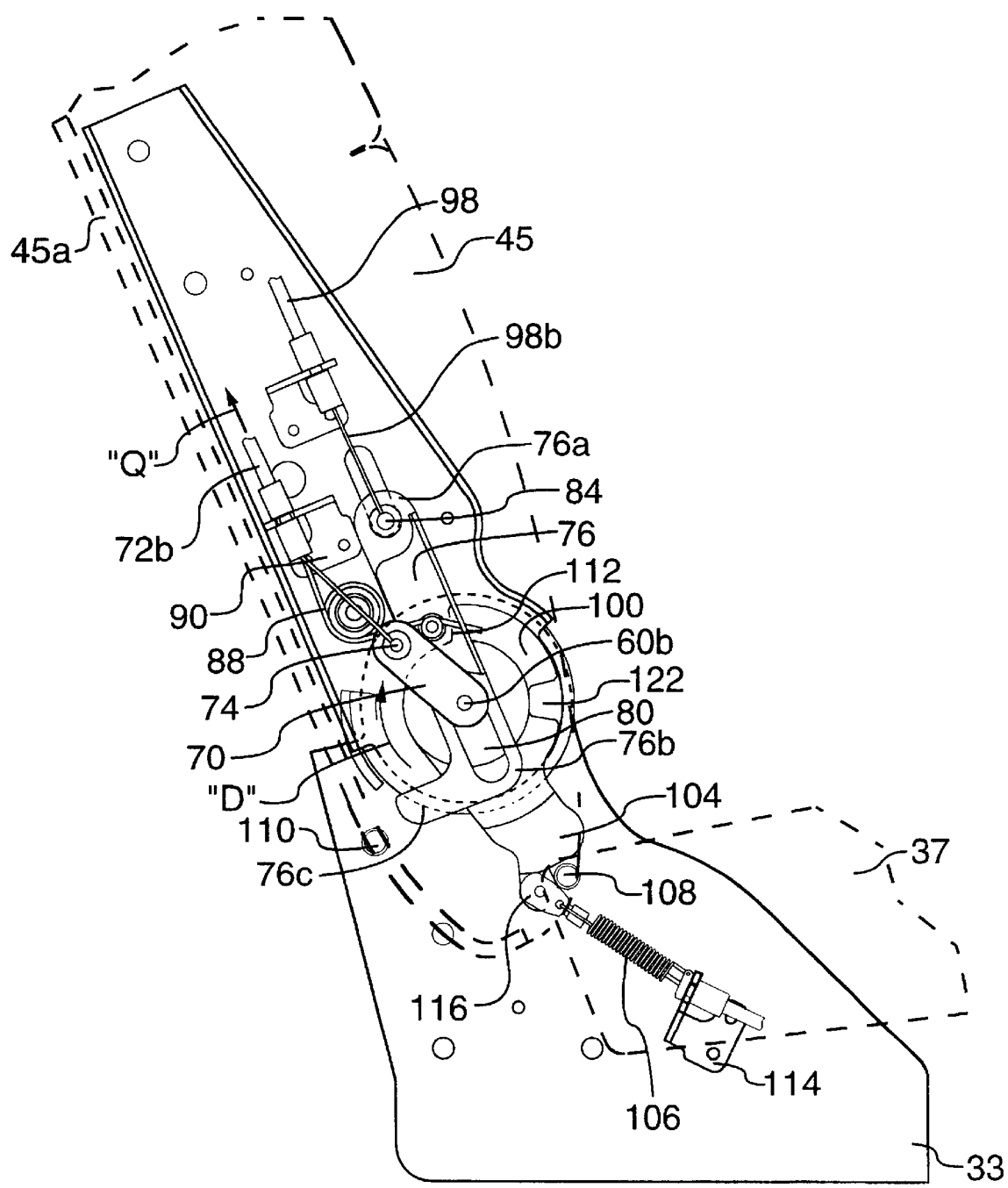
FIG. 6 is a side elevational view similar to FIG. 4, showing the first handle control means being actuated so as cause movement of the recliner control crank from the first crank position to the second crank position, thereby to unlock the rotary recliner for pivotal movement of the seat back member relative to the seat cushion member with actuation of the E-Z entry mechanism in corporated into the seat assembly.
Figure 7:
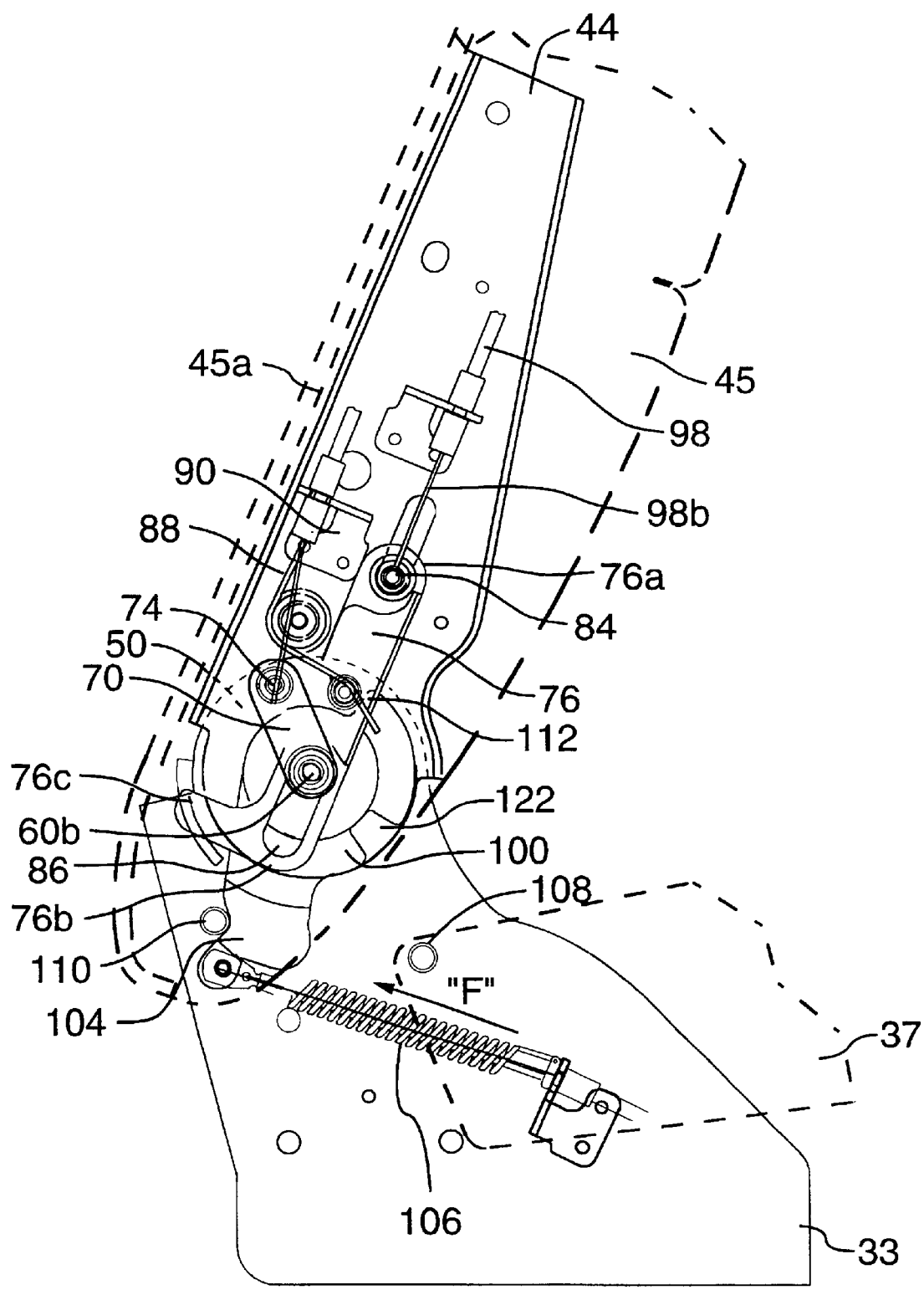
FIG. 7 is a side elevational view similar to FIG. 6, showing the seat back member having been pivot ally tilted, after the unlock ing action of FIG. 6, forwardly about the substantially horizontal pivot axis to cause the interlock plate member to rotate a threshold distance toward its second rotational limit position.

An interlock plate member 100 is mounted on the seat cushion member 30 in rotatable relation to the substantially horizontal pivot axis "X" for rotation between first (illustrated in FIGS. 1 through 6 and 10 through 14) and second (illustrated in FIGS. 7 and 8) rotational limit positions. The first rotational limit position is defined by the frictional contact of a front edge of a lower leg portion 104 of the interlock plate means 100 with a first stop pin 108 rigidly mounted on the seat cushion bracket 33. The second rotational limit position is defined by the frictional contact of a rear edge of the lower leg portion 104 of the interlock plate means 100 with a second stop pin 110 rigidly mounted on the seat cushion bracket 33. The configuration and significance of the first and second rotational limit positions of the interlock plate member will become more apparent as this description proceeds. The interlock plate member 100 is mounted for rotation as aforesaid about control shaft 60, as best seen in FIG. 5, and is biased towards its first rotational position by means of a second biasing means for biasing the interlock plate member 100 towards said first rotational position. In the preferred embodiment illustrated, the biasing means comprises a coil spring 106 interconnected between a bracket 114 attached to the seat cushion bracket 33 and the lower leg 104 of the interlock plate member 100, the latter connection being through a mounting eye 116 pivotally attached to a mounting stud 118, which stud is rigidly attached to the lower leg 104 of the interlock plate member 100. A spring retainer clip 117 (see FIG. 5) overlies the outboard end of the mounting stud 118 to hold the mounting eye 116 in place on the stud.

The interlock plate member 100 has a top edge 102 which defines a convexly arcuate cam pin follower surface 120 having a defining axis coincident with said substantially horizontal pivot axis "Z". The cam pin follower surface 120 extends between a camming shoulder 112 rearwardly positioned adjacent the top edge 102 and a radially inwardly directed cam pin receiving notch 122 forwardly positioned adjacent the top edge 102, as can be seen, for example in FIGS. 4, 6, 10 and 12. The cam pin receiving notch 122 is provided in the interlock plate member 100 to permit the cam pin 94 mounted on the link member 76 to enter therein to so as to lock the seat back member 40 in its fully forwardly folded load floor configuration at the appropriate time, as will be described more fully below.

Figure 13:
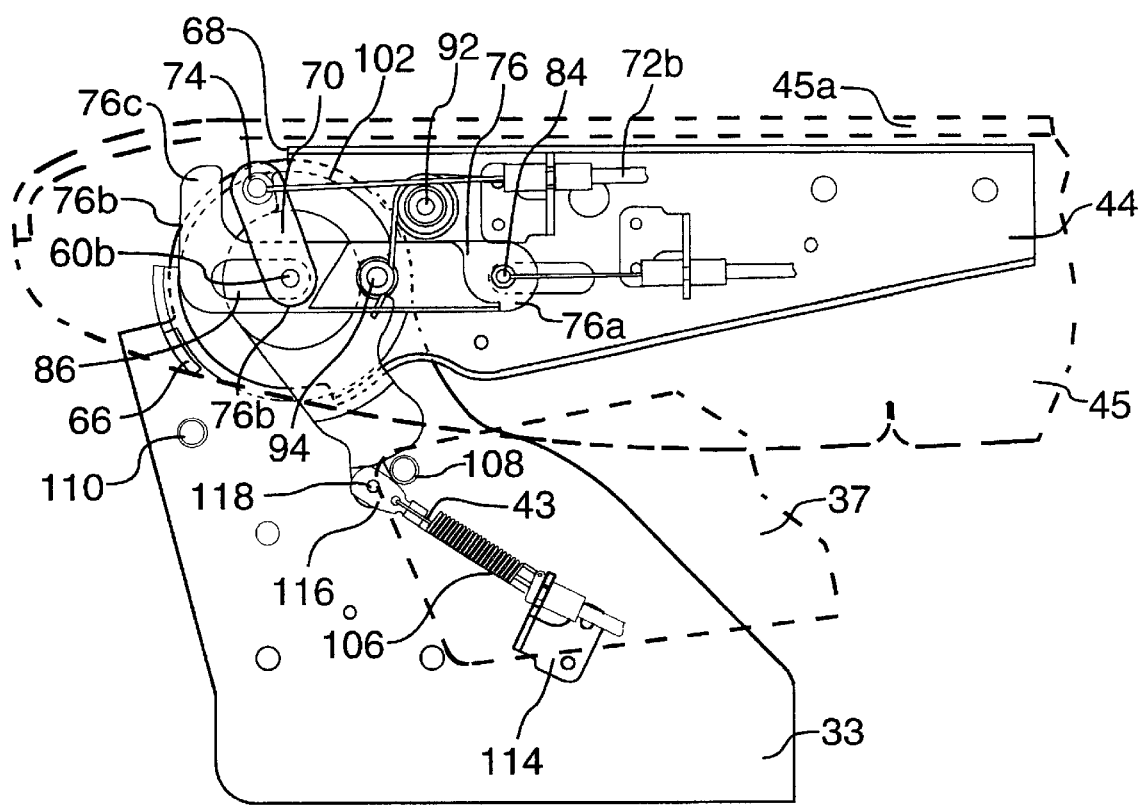
FIG. 13 is a side elevation view similar to FIG. 12, wherein the seat back member has been fully forwardly folded about the substantially horizontal pivot axis to its dumped configuration, whereat a cam pin on the link member has entered into a cam pin receiving slot so as to allow the rotary recliner to return to its locked configuration and thereby to lock the seat back member in its load floor configuration.
Figure 14:
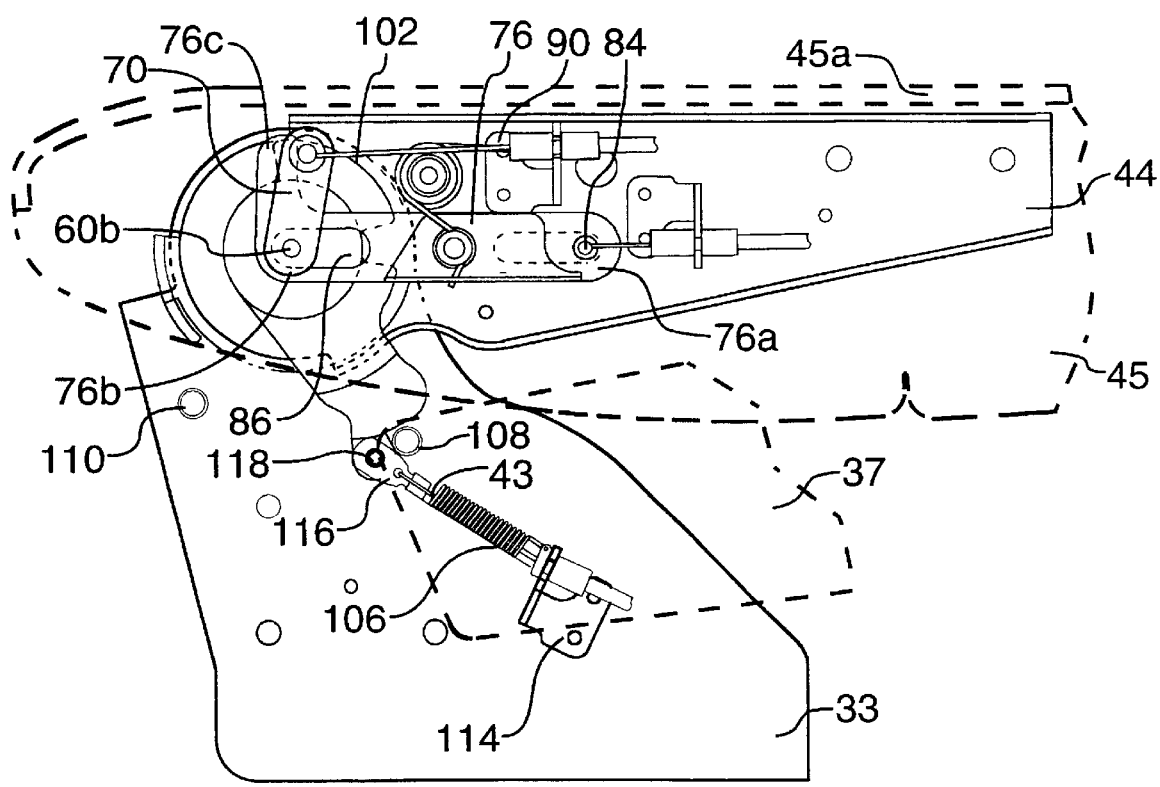
FIG. 14 is a side elevational view similar to FIG. 13, wherein the second handle control means has be re-actuated so as cause movement of the link member from the first link position to the second link position, thereby unlocking the rotary recliner and removing the cam pin on the link member from the cam pin receiving slot so as to permit rearward pivotal movement of the seat back member relative to the seat cushion member back toward a generally upright occupiable configuration.

The cam pin 94 is mounted, as previously described, on the link member 76 for driving engagement with the camming shoulder 112 upon forward pivotal movement of the seat back member 40 to cause the aforementioned rotation of the interlock plate member 100 from the first rotational limit position to the second rotational limit position against the aforementioned biasing of the second biasing means 106, when the link member 76 is in its first link position. Of course, to permit such forward pivotal movement of the seat back member 40 when the link member 76 is in its first link position (ie., its lowered position as seen, for example in FIGS. 3 or 4) the rotary recliner 50 must first be unlocked by activation of first handle control means 72a to cause movement of the control crank member 70 to its second crank position, as indicated by arrows "P" and "Q" in FIG. 6. Moreover, the positioning of the cam pin 94 on the link member 76 is such that it will clear the camming shoulder 112 upon forward pivotal movement of the seat back member 40 when the link member 76 is in its second link member, as will occur when the lever handle 96a of the second handle control means 96 is activated as aforesaid and as shown in FIGS. 10, 11, 12 and 14. Such clearance will avoid causing any rotation of the interlock plate member 100 from its first rotational limit position. It will also be appreciated from FIGS. 11 and 12 that, if the lever handle 96a is released by a user while the cam pin 94 is positioned over the cam pin follower surface 120, the cam pin 94 will, due to biasing by the torsion spring 88, contact and slide along the cam pin follower surface 120 during continued forward pivotal movement of the seat back member 40, thus preventing the link member 76 from returning to its first link position, under biasing of the torsion spring 88, to again lock up the rotary recliner 50. Under these conditions, such re-locking of the rotary recliner 50 can only re-occur upon full forward pivotal movement of the seat back member 40 to the point where the cam pin 94 enters into the cam pin receiving notch 122, at which point the seat back member 40 has been fully dumped to the load floor configuration depicted in FIGS. 2 and 13. In order to return the seat back member 40 from the locked load floor configuration of FIG. 13 to a more upright configuration, it is necessary for the user to again activate the lever handle 96a so as to move the link member 76 to its second link position (as shown in FIG. 14), so as to remove the cam pin 94 from the cam pin receiving notch 122, and to thereafter pivotally move the seat back member 40 rearwardly to a generally upright orientation whereat the cam pin 94 will again clear the cam follower surface 120 so as to permit re-locking of the rotary recliner 50.

A connection means, generally designated by reference numeral 124, is interconnected between the interlock plate member 100 and the track lock releasing means 36 for unlocking the track lock means (not visible) when the interlock plate member 100 is rotated, as aforesaid, under the driving contact of the cam pin 94 with the camming shoulder 112 toward the second rotational limit position of the interlock plate member 100. The structure of the connection means 124 can be best understood by reference to FIGS. 3 and 9 and comprises a Bowden cable having an outer fixed sheath portion 28b and an inner cable portion 38a operatively sliding therein. The inner cable portion 38a has a first end 41 operatively connected to the track lock releasing means 36, in a manner to be described more fully below, and an opposed second end 43 operatively connected to the interlock plate 100 as follows. The second end 43 is swaged, or otherwise securely fastened, to the mounting eye 116, which mounting eye is, in turn, securely fastened to the mounting stud 118 as described above. Thus, rearward rotation of the interlock plate 100 from its first rotational limit position (see FIG. 6) towards its second rotational limit position (see FIG. 7) causes a pulling force to be exerted on the inner cable portion 38a in the direction of arrow "F" of FIG. 7. The first end 41 of the Bowden cable is fitted with a cylindrically shaped connector member 130, which connector member 130 has a laterally projecting connection socket portion 132, which socket portion pivotally connects to a lever arm 126 of the track lock releasing means 36. The lever arm 126 is itself pivotally mounted, by means of a pivot pin 134, on an upwardly projecting ear bracket 136 of the track lock releasing means 36. Thus, the aforementioned pulling movement of the inner cable portion 38a in the direction of arrow "F" of FIG. 7 causes the connector member 130 to move in the direction of arrow "G" of FIG. 9, which in turn, causes downward pivotal movement of the lever arm 126 about pivot pin 134 in the direction of arrow "T" of FIG. 9. Such downward pivotal movement, causes the lever arm 126 to urgingly contact a bell-crank lever member 128 welded, or otherwise rigidly affixed, to the crossbar member 54, which urging contact causes the crossbar member 54 to rotate in the direction of arrow "B" of FIG. 9, with concurrent generally downward movement (in the direction of arrow "C" of FIG. 9) of bent end finger 58. This downward movement of bent end finger 58 causes unlocking of the track lock means in the manner previously disclosed, with consequential activation of the E-Z entry mechanism 24, as previously disclosed. Thus, movement of the interlock plate member 100 from its first rotational limit position toward its second rotational limit position has the effect of providing for activation of the E-Z entry mechanism 24. The threshold distance toward the second rotational limit position will vary somewhat from one mechanism to another, due to normal manufacturing and assembly tolerances. However, such threshold distance must be of sufficient magnitude to cause the inner cable portion 38a to move in the direction of arrow "F" of FIG. 7 a minimum distance necessary to cause enough downward movement of bent end finger 58 to unlock the track lock means, and the various components of the control mechanism can be routinely sized and assembled accordingly. In any event, such threshold distance must be attained at, or before, the interlock plate member 100 contacts the second stop pin 110 as aforesaid.

In operation, a user wishing to move the seat back member 40 from the normal its upright operating position (design position) to its fully forwardly folded (dumped) load floor configuration, as shown in FIG. 2, without activation of the E-Z entry mechanism, will, beginning from the design position shown in FIGS. 1, 3 and 4, grasp the lever handle 96a, and pull same upwardly, so as to cause operatively upward movement of the Bowden cable 98 (in the direction of arrow "S" of FIG. 10). This action, in turn, causes the link member 76 to slide upwardly in the direction of arrow "S" of FIG. 10, carrying with it the cam pin 94 against the biasing of torsion spring 88. This sliding motion causes the cam pin 94 to clear camming shoulder 112, as the foot portion 76c of link member 76 frictionally contacts the button fastener 74 positioned on the control crank member 70. Continued upward sliding of the link member 76 in this manner causes the control crank member 70 to rotate in a clockwise direction (as shown by arrow "D" of FIG. 10) from the first crank position (shown in FIGS. 1, 3 and 4,) to the second crank position (as shown in FIG. 10) so as to unlock the rotary recliner 50, as previously discussed. This unlocking action allows the seat back member 40 to be forwardly pivoted about the substantially horizontal pivot axis "Z" to the forwardly tilted configuration shown in FIG. 11. As the cam pin 94 has cleared the camming shoulder 112 in effecting unlocking of the rotary reclining 50, it has remained at, or above, the level of the cam follower surface 120 (against the biasing of the torsion spring 88), so as to avoid having caused any rotational motion on the inner lock plate member 100 during the forward pivotal movement of the seat back member 40 from the configuration of FIG. 10 to the configuration of FIG. 11. If the lever handle 96a is released at the FIG. 11 configuration, the torsion spring 88 will cause the link member 76 to move in a direction opposite of that of arrow "S", so as to cause the cam pin 94 to slidingly contact the cam follower surface 120, as depicted in FIG. 12. It will be noted, however, that the cam pin 94 is positioned such that control crank member 70 has not returned to its first cranked position, such that the rotary recliner 50 remains in its unlocked configuration. This permits continued forward pivotal movement of the seat back member 40 in the direction of arrow "R" of FIG. 12, to the dumped load floor configuration of the seat back member 40, as depicted in FIG. 13, whereat the cam pin 94 can split from its sliding engagement with the cam follower surface 120 into the cam pin receiving notch 122, thereby permitting the control crank member 70 to return to its first crank position under urging of the torsion spring 88, thereby to cause the rotary recliner 50 to again assume its locked load floor configuration. If the user wishes to return the seat back member 40 to a generally upright inclination, he must again grasp the lever handle 96a and raise same, so as to again move the link member 76 in the general manner previously described to the second link position as shown in FIG. 14, thereby to remove the cam pin 94 from the cam pin receiving notch 122, which in turn unlocks the rotary recliner 50 by interaction of the foot portion 76c with the button fastener 74 as previously described. It will be appreciated that during the forward pivotal movement of the seat back member 40 through the sequence of FIGS. 10 through 13, and back again, the interlock plate member 100 remains fixed at all time, being held in place against the first stop means 108 by means of the second biasing means coil spring 106.

Referring now to activation of the E-Z entry mechanism by a user, reference will again be had to the design position depicted in FIGS. 1, 3 and 4, as a starting position. In the manner of operation to be described, the intention of the user is to forwardly tilt the seat back member 40 so as to simultaneously cause forward translation of the seat assembly 20 relative to the vehicle floor 22 to an E-Z entry position depicted in FIG. 8. To effect such movement, the user will grasp lever member 72a and pull same upwardly so as to pull the Bowden cable 72b upwardly, thereby causing rotation of the control crank member 70 in the direction of arrow "P" of FIG. 6 from its first crank position (as shown in FIGS. 1 and 2) to a second crank position, thereby to unlock the rotary recliner 50 for pivotal movement of the seat back member 40 relative to the seat cushion member 30. As the link member 76 has not moved during this action, the cam pin 94 remains in contact with the camming shoulder 112, such that further forward rotational movement of the seat back member 40 causes the interlock plate member 100 to rotate (also in the direction of arrow "P" of FIG. 6) from its first rotational position (depicted in FIG. 6) towards its second rotational position (depicted in FIG. 7), which movement causes a simultaneous movement of the inner wire 38a of the Bowden cable of the connection means 124, as previously described. This movement of the inner wire 38a of the Bowden cable causes activation of the track lock releasing means, as previously detailed, thereby allowing the biasing springs 26, 27', to pull the second (upper) track sections 28b and 28b' (and the attached seat cushion member 30) forwardly in the direction of arrow "H" to the forwardly translated position depicted in FIG. 8.

I claim:

1. In a vehicle seat assembly attachable to a vehicle floor, which vehicle seat assembly has a seat back member defining a longitudinal seat back axis, said seat back member being mounted on a seat cushion member by means of a rotary recliner operable between locked and unlocked configurations to selectively control pivotal movement of the seat back member relative to the seat cushion member about a substantially horizontal pivot axis, and at least two seat track assemblies, with each seat track assembly having a first track section attachable to the vehicle floor and extending from front to rear when installed on the vehicle floor and a second track section which is attachable to the seat cushion member and is slidably engaged with the first track section, and a track locking assembly having a track lock means for locking the first and second track sections together at any position from a forward position of the second track section to a rearward position of the second track section and a track lock releasing means for selectively unlocking the track lock means from locking as aforesaid, a rotary recliner control mechanism comprising:

(a) a recliner control crank member mounted on the rotary recliner for movement of the recliner control crank member between first and second crank positions corresponding to said locked and unlocked configurations, respectively, of said rotary recliner, said recliner control crank member being biased by the rotary recliner towards said first crank position;

(b) a first handle control means mounted on the seat back member and connected to said recliner control crank member for selective movement of the recliner control crank member between said first and second crank positions against said biasing of the rotary recliner;

(c) an elongate link member having opposed first and second ends, said link member being connected adjacent said first end to said seat back member for sliding movement relative to said longitudinal seat back axis between first and second link positions, and adjacent its second end to a pivot point for pivotal movement around said substantially horizontal pivot axis concurrent with said pivotal movement of the seat back member and for said sliding movement of the link member transverse to said substantially horizontal pivot axis;

(d) a first biasing means for biasing said link member towards said first link position;

(e) said link member having a laterally displaced foot portion adjacent said second end, said foot portion being adapted to frictionally engage said recliner control crank member upon said sliding movement of said link member from said first link position to said second link position so as to cause said recliner control crank member to attain said second crank position when said link member has moved to said second link position, thereat to cause said rotary recliner to attain its unlocked configuration;

(f) a second handle control means mounted on the seat back member and connected to said link member for selective movement of the link member between said first and second link positions against said biasing of the first biasing means;

(g) an interlock plate member mounted on the seat cushion member in rotatable relation to said substantially horizontal pivot axis for rotation between first and second rotational limit positions, said interlock plate member having a camming shoulder positioned adjacent a top edge of said interlock plate member;

(h) a second biasing means for biasing said interlock plate member towards said first rotational limit position;

(i) a cam pin mounted on the link member for driving engagement with said camming shoulder upon forward pivotal movement of the seat back member to cause said rotation of said interlock plate member from said first rotational limit position to said second rotational limit position against said biasing of the second biasing means when said link member is in said first link position, and for clearing motion of said camming shoulder by said cam pin when said link member is in said second link position;

(j) a connection means interconnected between the interlock plate member and the track lock releasing means for unlocking the track lock means when the interlock plate member is rotated, as aforesaid, under said driving contact of said cam pin a threshold distance toward said second rotational limit position.

2. A vehicle seat assembly according to claim 1, wherein said rotary recliner has a rotational axis coincident with said substantially horizontal pivot axis.

3. A rotary recliner control mechanism according to claim 2, wherein the recliner control crank is mounted on the rotary control recliner for said movement of the recliner control crank member between said first and second crank configurations by rigid transverse attachment of said recliner control crank to a control shaft protruding from said rotary recliner in coincident relation to said substantially horizontal pivot axis.

4. A rotary recliner control mechanism according to claim 3, wherein the pivot point about which said recliner control crank member is mounted is on the central axis of said control shaft, which control shaft passes through an elongated slot formed in said elongate link member adjacent its second end to allow for said rigid transverse attachment of said recliner control crank member to a free end of the control shaft.

5. A rotary recliner control mechanism according to claim 4, wherein the top edge of said interlock plate member defines a convexly arcuate cam pin follower surface having a defining axis coincident with said substantially horizontal pivot axis, said cam follower surface being positioned to allow said cam pin to slide therealong upon forward pivotal movement of the seat back member relative to the seat cushion member when said link member is in its second link position so as to prevent return of the link member, under biasing of the first biasing means, from said second link position to said first link position during said pivotal movement of the seat back member, thereby to hold said rotary recliner in its unlocked configuration during said forward pivotal movement of the seat back member.

6. A rotary recliner control mechanism according to claim 5, wherein a radially inwardly directed cam pin receiving notch is positioned on said interlock plate member adjacent the forward extent of said arcuate cam follower surface so as to permit said cam pin to enter into said receiving notch from said sliding interaction with said cam follower surface under said biasing of said link member by said first biasing means so as to permit said link member to return to said first link position, thereby to allow said rotary recliner to return to its locked configuration upon full forward pivotal movement of the seat back member to a load floor configuration.

7. A rotary recliner control mechanism according to claim 6, wherein said first and second rotational limit positions of said interlock plate member are defined by first and second guide pins each rigidly mounted on said seat cushion member in spaced to one another so as to arrestingly contact a leg portion of said interlock plate member at each of said rotational limit positions to constrict rotation of said interlock plate therebetween.

8. A rotary recliner control mechanism according to claim 7, wherein said first handle control means comprises a Bowden cable operatively connected at a first end to a lever handle member pivotally mounted on the seat back member, and at its opposed second end to said recliner control crank member.

9. A rotary recliner control mechanism according to claim 8, wherein said second handle control means comprises a Bowden cable operatively connected at a first end to a lever handle member mounted on the seat back member, and at its opposed second end to the first end of said link member.

10. A rotary recliner control mechanism according to claim 9, wherein said elongate link member is connected to said seat back member for sliding movement relative to said longitudinal seat back member by means of a guide pin rigidly attached to said elongate link member adjacent said first end thereof, which guide pin extends through an elongated slot formed in said seat back member in substantial alignment with the longitudinal seat back axis to an enlarged pin end which retains said guide pin in said elongated slot.

11. A rotary recliner control mechanism according to claim 10, wherein said first biasing means comprises a torsion spring operatively interconnected between said seat back member and said link member to urge said link member towards said first link position.

12. A rotary recliner control mechanism according to claim 11, wherein said second biasing means comprises a coil spring operatively interconnected between said seat cushion member and said interlock plate member to urge said interlock plate member towards said first rotational limit position.

13. A rotary recliner control mechanism according to claim 12, wherein said connection means comprises a Bowden cable operatively connected at a first end to said track lock releasing means and, at its opposed second end to said interlock plate member.

14. A rotary recliner control mechanism according to claim 13, wherein said coil spring is connected at one end to a bracket positioned on the seat cushion member and at its opposite other end to said second end of the Bowden cable attached to said interlock plate member.

* * * * *